United States Patent
Propheter-Hinckley (10) Patent No.: US 10,767,487 B2
(45) Date of Patent: Sep. 8, 2020

(54) AIRFOIL WITH PANEL HAVING FLOW GUIDE

(71) Applicant: United Technologies Corporation, Farmington, CT (US)

(72) Inventor: Tracy A. Propheter-Hinckley, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 524 days.

(21) Appl. No.: 15/353,892

(22) Filed: Nov. 17, 2016

(65) Prior Publication Data

US 2018/0135419 A1 May 17, 2018

(51) Int. Cl.
*F01D 5/14* (2006.01)
*F01D 9/04* (2006.01)
(Continued)

(52) U.S. Cl.
CPC ............ *F01D 5/147* (2013.01); *F01D 5/189* (2013.01); *F01D 5/282* (2013.01); *F01D 5/288* (2013.01); *F01D 9/041* (2013.01); *F01D 25/12* (2013.01); *F02C 3/04* (2013.01); *F04D 29/324* (2013.01); *F04D 29/542* (2013.01); *F04D 29/582* (2013.01); *F05D 2220/30* (2013.01); *F05D 2230/51* (2013.01); *F05D 2230/52* (2013.01); *F05D 2230/54* (2013.01); *F05D 2240/12* (2013.01); *F05D 2240/30* (2013.01); *F05D 2250/185* (2013.01); *F05D 2300/611* (2013.01); *Y02T 50/672* (2013.01)

(58) Field of Classification Search
CPC . F01D 9/02; F01D 9/041; F01D 9/042; F01D 9/044; F01D 5/12; F01D 5/14; F01D 5/147; F01D 5/18; F01D 5/188; F01D 5/189; F01D 5/282; F01D 5/284; F05D 2230/51; F05D 2230/60; F05D 2250/185; Y02T 50/672
See application file for complete search history.

(56) References Cited

U.S. PATENT DOCUMENTS 2,930,580 A * 3/1960 Hayes ............... F01D 5/187
416/90 R
3,215,511 A 11/1965 Chisholm
(Continued)

FOREIGN PATENT DOCUMENTS

EP 0764764 3/1997
EP 1764481 3/2007
(Continued)

OTHER PUBLICATIONS

U.S. Appl. No. 13/429,474, filed Mar. 26, 2012.
(Continued)

*Primary Examiner* — Brian P Wolcott
*Assistant Examiner* — Elton K Wong
(74) *Attorney, Agent, or Firm* — Carlson, Gaskey & Olds, P.C.

(57) ABSTRACT

An airfoil includes a core structure, a passage, and a panel attached with the core structure adjacent the passage. The panel has an exterior gas path side and an opposed interior side bordering the passage. The interior side includes at least one flow guide in the passage.

9 Claims, 7 Drawing Sheets

(51) Int. Cl.
*F01D 5/18* (2006.01)
*F01D 25/12* (2006.01)
*F02C 3/04* (2006.01)
*F04D 29/32* (2006.01)
*F04D 29/54* (2006.01)
*F04D 29/58* (2006.01)
*F01D 5/28* (2006.01)

(56) References Cited

U.S. PATENT DOCUMENTS

| | | | |
|---|---|---|---|
| 4,137,008 A | | 1/1979 | Grant et al. |
| 4,247,259 A | | 1/1981 | Saboe et al. |
| 4,396,349 A | | 8/1983 | Hueber |
| 4,914,794 A | | 4/1990 | Strangman |
| 5,358,379 A | | 10/1994 | Pepperman et al. |
| 5,392,515 A | * | 2/1995 | Auxier ............. B23P 15/04 29/463 |
| 5,538,380 A | | 7/1996 | Norton et al. |
| 5,681,616 A | | 10/1997 | Gupta et al. |
| 5,705,231 A | | 1/1998 | Nissley et al. |
| 5,827,045 A | * | 10/1998 | Beeck ............. F01D 5/284 416/96 A |
| 5,951,892 A | | 9/1999 | Wolfla et al. |
| 6,000,906 A | | 12/1999 | Draskovich |
| 6,102,656 A | | 8/2000 | Nissley et al. |
| 6,224,963 B1 | | 5/2001 | Strangman |
| 6,316,078 B1 | | 11/2001 | Smialek |
| 6,503,574 B1 | | 1/2003 | Skelly et al. |
| 6,514,046 B1 | | 2/2003 | Morrison et al. |
| 6,543,996 B2 | | 4/2003 | Koschier |
| 6,703,137 B2 | | 3/2004 | Subramanian |
| 6,709,230 B2 | | 3/2004 | Morrison et al. |
| 6,846,574 B2 | | 1/2005 | Subramanian |
| 7,104,756 B2 | | 9/2006 | Harding et al. |
| 7,316,539 B2 | | 1/2008 | Campbell |
| 7,326,030 B2 | | 2/2008 | Albrecht et al. |
| 7,435,058 B2 | | 10/2008 | Campbell et al. |
| 7,452,182 B2 | | 11/2008 | Vance et al. |
| 7,520,725 B1 | | 4/2009 | Liang |
| 7,670,116 B1 | | 3/2010 | Wilson, Jr. et al. |
| 7,963,745 B1 | | 6/2011 | Liang |
| 8,079,806 B2 | | 12/2011 | Tholen et al. |
| 8,182,208 B2 | | 5/2012 | Bridges, Jr. et al. |
| 8,197,211 B1 | | 6/2012 | Liang |
| 8,202,043 B2 | | 6/2012 | McCaffrey |
| 8,251,651 B2 | | 8/2012 | Propheter-Hinckley et al. |
| 8,366,392 B1 | | 2/2013 | Laing |
| 8,480,366 B2 | | 7/2013 | Malecki et al. |
| 8,506,243 B2 | | 8/2013 | Strock et al. |
| 8,556,578 B1 | * | 10/2013 | Memmen ............. F01D 5/189 277/644 |
| 8,821,124 B2 | | 9/2014 | Viens et al. |
| 2001/0033793 A1 | * | 10/2001 | Lewis ............. F01D 5/147 416/232 |
| 2002/0108734 A1 | * | 8/2002 | Beeck ............. B23P 15/04 164/76.1 |
| 2003/0049127 A1 | * | 3/2003 | Tiemann ............. F01D 5/189 416/97 R |
| 2007/0128043 A1 | * | 6/2007 | Morrison ............. F01D 5/147 416/241 B |
| 2008/0159850 A1 | * | 7/2008 | Tholen ............. F01D 11/12 415/139 |
| 2008/0260537 A1 | * | 10/2008 | Lang ............. F01D 5/189 416/96 R |
| 2010/0136258 A1 | | 6/2010 | Strock et al. |
| 2011/0097538 A1 | * | 4/2011 | Bolcavage ............. F01D 5/288 428/137 |
| 2013/0039774 A1 | * | 2/2013 | Viens ............. F01D 5/147 416/226 |
| 2016/0090851 A1 | | 3/2016 | Carr et al. |
| 2017/0030202 A1 | * | 2/2017 | Itzel ............. F01D 5/188 |

FOREIGN PATENT DOCUMENTS

| | | |
|---|---|---|
| EP | 2105579 | 9/2009 |
| EP | 2418353 | 2/2012 |
| EP | 2853688 | 4/2015 |
| EP | 2907974 | 8/2015 |
| EP | 2975215 | 1/2016 |
| EP | 3075531 | 10/2016 |
| GB | 2272453 | 5/1994 |
| JP | 61066802 | 4/1986 |
| JP | 05321602 | 12/1993 |
| WO | 2015047698 | 4/2015 |

OTHER PUBLICATIONS

U.S. Appl. No. 14/659,718, filed Mar. 17, 2015.
U.S. Appl. No. 14/812,668, filed Jul. 29, 2015.
Extended European Search Report for EP Application No. 17202339.2, dated May 29, 2018.

* cited by examiner

AIRFOIL WITH PANEL HAVING FLOW GUIDE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes a core structure, a passage, and a panel attached with the core structure adjacent the passage. The panel has an exterior gas path side and an opposed interior side bordering the passage. The interior side includes at least one flow guide in the passage.

In a further embodiment of any of the foregoing embodiments, the panel defines at least a portion of an airfoil profile.

In a further embodiment of any of the foregoing embodiments, the at least one flow guide is a protrusion.

In a further embodiment of any of the foregoing embodiments, the at least one flow guide is a rail.

In a further embodiment of any of the foregoing embodiments, the at least one flow guide includes a plurality of spaced-apart ridges.

In a further embodiment of any of the foregoing embodiments, the at least one flow guide includes a bearing surface.

A further embodiment of any of the foregoing embodiments includes a baffle seated on the bearing surface.

A further embodiment of any of the foregoing embodiments includes a baffle bordering the passage.

In a further embodiment of any of the foregoing embodiments, the flow guide forms a serpentine with the baffle.

In a further embodiment of any of the foregoing embodiments, the panel includes a geometric segmented coating.

A gas turbine engine according to an example of the present disclosure includes a compressor section, a combustor in fluid communication with the compressor section, and a turbine section in fluid communication with the combustor. One of the turbine section or the compressor section includes an airfoil that has a core structure, a passage, and a panel attached with the core structure adjacent the passage. The panel has an exterior gas path side and an opposed interior side bordering the passage. The interior side includes at least one flow guide in the passage.

In a further embodiment of any of the foregoing embodiments, the at least one flow guide is a protrusion.

In a further embodiment of any of the foregoing embodiments, the at least one flow guide includes a plurality of spaced-apart ridges.

In a further embodiment of any of the foregoing embodiments, the at least one flow guide includes a bearing surface.

An airfoil according to an example of the present disclosure includes a panel that has top and bottom side edges, first and second lateral side edges, an exterior gas path side, and an opposed interior side. The exterior side defines at least a portion of an airfoil profile and the interior side includes at least one flow guide.

In a further embodiment of any of the foregoing embodiments, the at least one flow guide is a protrusion.

In a further embodiment of any of the foregoing embodiments, the at least one flow guide is a rail.

In a further embodiment of any of the foregoing embodiments, the at least one flow guide includes a plurality of spaced-apart ridges.

In a further embodiment of any of the foregoing embodiments, the at least one flow guide includes a bearing surface.

In a further embodiment of any of the foregoing embodiments, the panel includes a geometric segmented coating.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
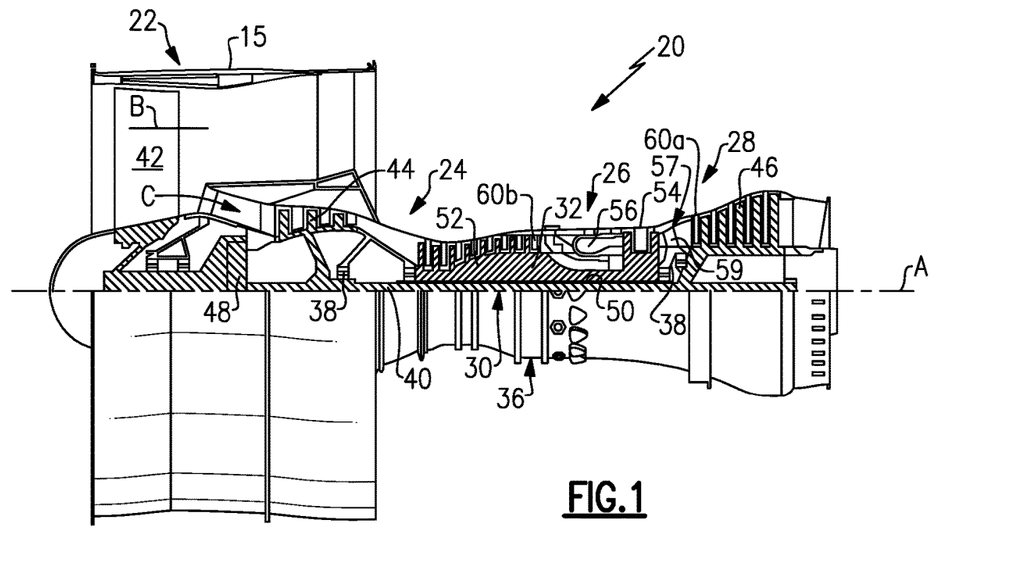
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
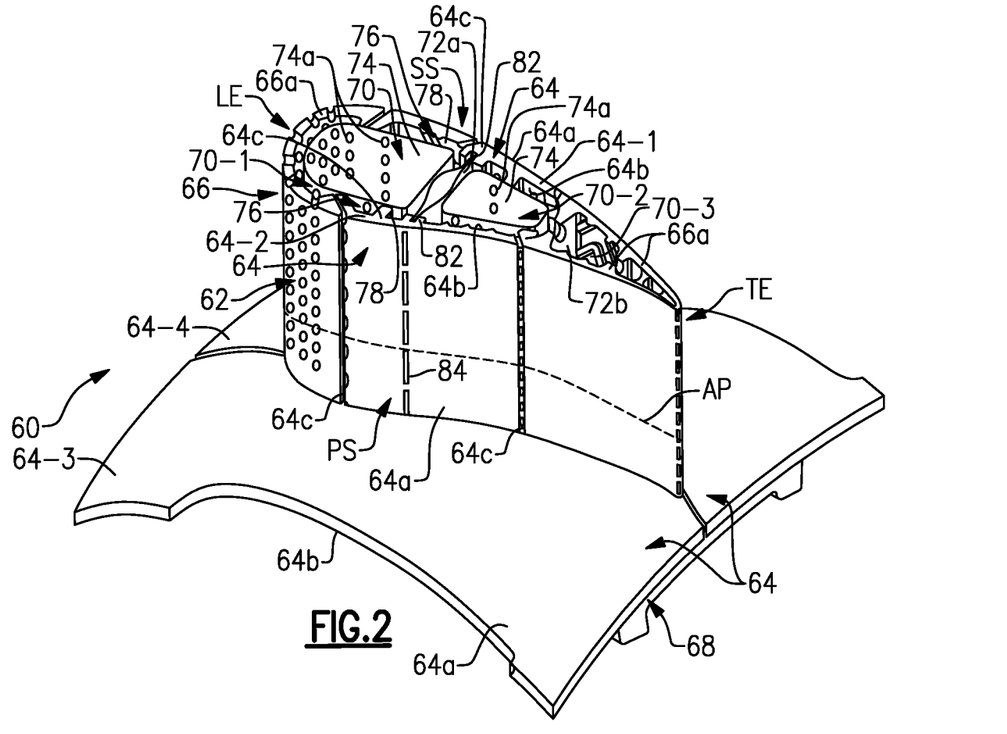
FIG. 2 illustrates an example airfoil of the gas turbine engine of FIG. 1.

FIG. 2 illustrates one such component, namely an airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades, other airfoils, or other articles that are exposed to high temperatures.

The airfoil 60 includes a core structure 62 and a plurality of panels 64. The core structure 62 is also shown in an isolated view in FIG. 3, with the panels 64. In this example, the core structure 62 generally includes an airfoil section 66 and an endwall section 68 from which the airfoil section 66 radially extends. The panels 64, which are individually designated 64-1/64-2/64-3/64-4, are attached with the core structure 62. For example, the panels 64 may be mechanically fastened to the core structure 62 by, but not limited to, interlocking features on the core structure 62 and panels 64. As shown in this example, the core structure 62 includes a pressure-side panel slot 71a and a suction-side panel slot 71b. Each of the pressure-side panel slot and the suction-side panel slot 71a/71b included sloped slot edges 73 that face inwards to internal cavity 70. The panels 64-1/64-2 are on the airfoil section 66 and are disposed, respectively, in the slots 71a/71b. The panels 64-3/64-4 are on the platform section 68. The panels 64-3/64-4 form an endwall of the core case path C. Although designated differently, panels 64-3 and 64-4 are identical. That is, the edges of each of the panels 64-3 and 64-4 are contoured to fit with the next adjacent airfoil section.

Each of the panels 64 includes an exterior gas path side 64a, an opposed interior side 64b, and side edges 64c. The side edges 64c are the perimeter regions, not necessarily the terminal faces of the panels 64. For the panels 64-1/64-2 the radially inner and outer side edges are top and bottom edges and the fore and aft edges are lateral side edges. As depicted in FIG. 2, the side edges 64c of the panels 64-1/64-2 are sloped to that face outwards from the internal cavity 70 and that bear against the sloped slot edges 73 of the panel slots 71a/71b, respectively. The panel 64-2 defines the pressure side of the airfoil profile and the panel 64-1 defines the suction side of the airfoil profile such that the panels 64-1/64-2 and the walls of the core structures 62 together define the complete peripheral shape of the airfoil profile. For purposes of this disclosure the circumferential side edges are the top and bottom edges of the panels 64-3/64-4 and the fore and aft edges are lateral side edges. As an example, each panel 64 is a distinct piece such that the exterior gas path side 64a, the opposed interior side 64b, and the side edges 64c completely bound the panel 64.

The airfoil section 66 includes one or more walls 66a that are part of the core structure 62. The wall or walls 66a and the panels 64-1/64-2 define at least a portion of an airfoil profile (AP), which is the peripheral shape when viewed in a radial direction. For example, the airfoil profile (AP) has a wing-like shape that provides a reaction force via Bernoulli's principle.

The airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP). The leading edge may be the portion of the airfoil profile (AP) that first contacts air or the foremost edge of the airfoil profile (AP). For a variable vane, the leading edge may shift, depending on the orientation of the vane. In the illustrated example, the wall or walls 66a of the core structure 62 form the leading end (LE) and the trailing end (TE), the panel 64-1 forms the suction side (SS) or a portion thereof, and the panel 64-2 forms the pressure side (PS) or a portion thereof. As will be appreciated, the panels 64-1/64-2 could alternatively form different portions of the airfoil profile (AP), or an additional panel or panels could be used to form other portions of the airfoil profile (AP).

Figure 3:
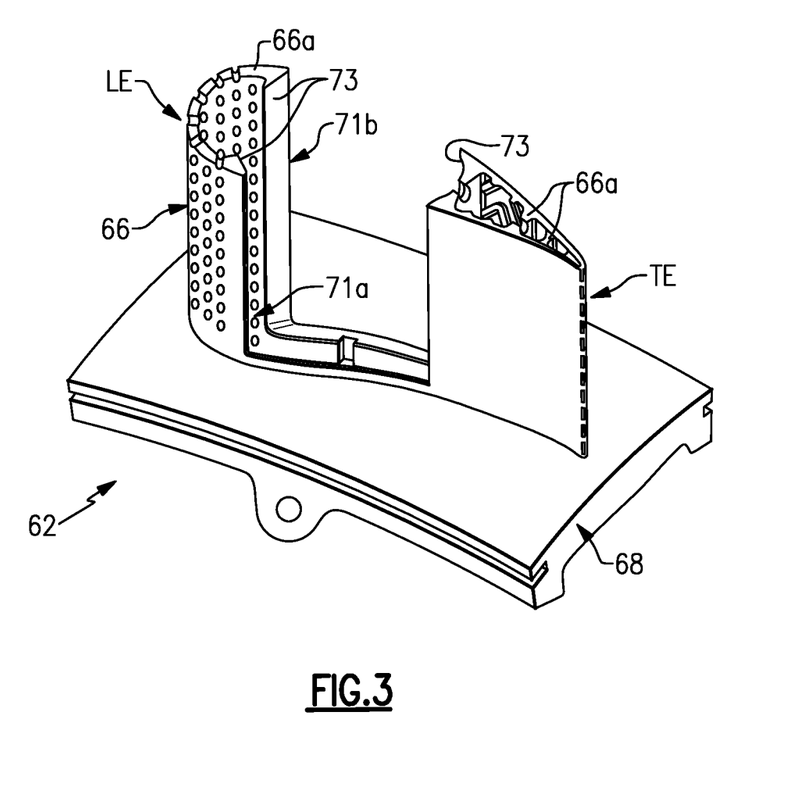
FIG. 3 illustrates a core structure of the airfoil of FIG. 2.

The airfoil section 66 of the airfoil 60 further includes an internal cavity 70, which may be divided into a plurality of sub-cavities. For instance, a spring rib 72a divides the internal cavity 70 into a forward cavity 70-1 and an intermediate cavity 70-2. The spring rib 72a may also facilitate proper positioning of the panels 64-1/64-2. A rib 72b divides the intermediate cavity 70-2 from an aft-most cavity 70-3. In this example, the airfoil section 66 includes baffles 74 disposed in the respective cavities 70-1/70-2. FIG. 3 illustrates the airfoil 60, but without the baffles 74.

The baffles 74 define passages 76 with the panels 64-1/64-2. For instance, the baffle 74 bounds one side of the passages 76 and the respective panels 64-1/64-2 bound other sides of the passages 76. The interior sides 64b of the panels 64-1/64-2 include one or more flow guides 78 in the passage 76. The flow guides 78 direct or influence flow of cooling bleed air fed into the passages 76.

Figure 4:
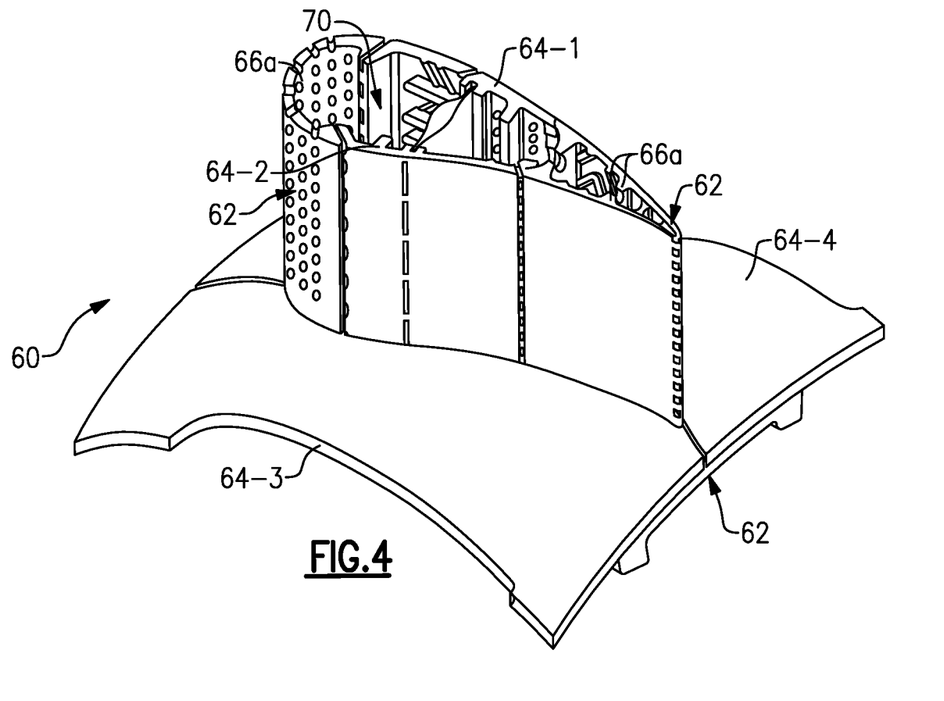
FIG. 4 illustrates the airfoil of FIG. 2, but without the baffles.
Figure 5:
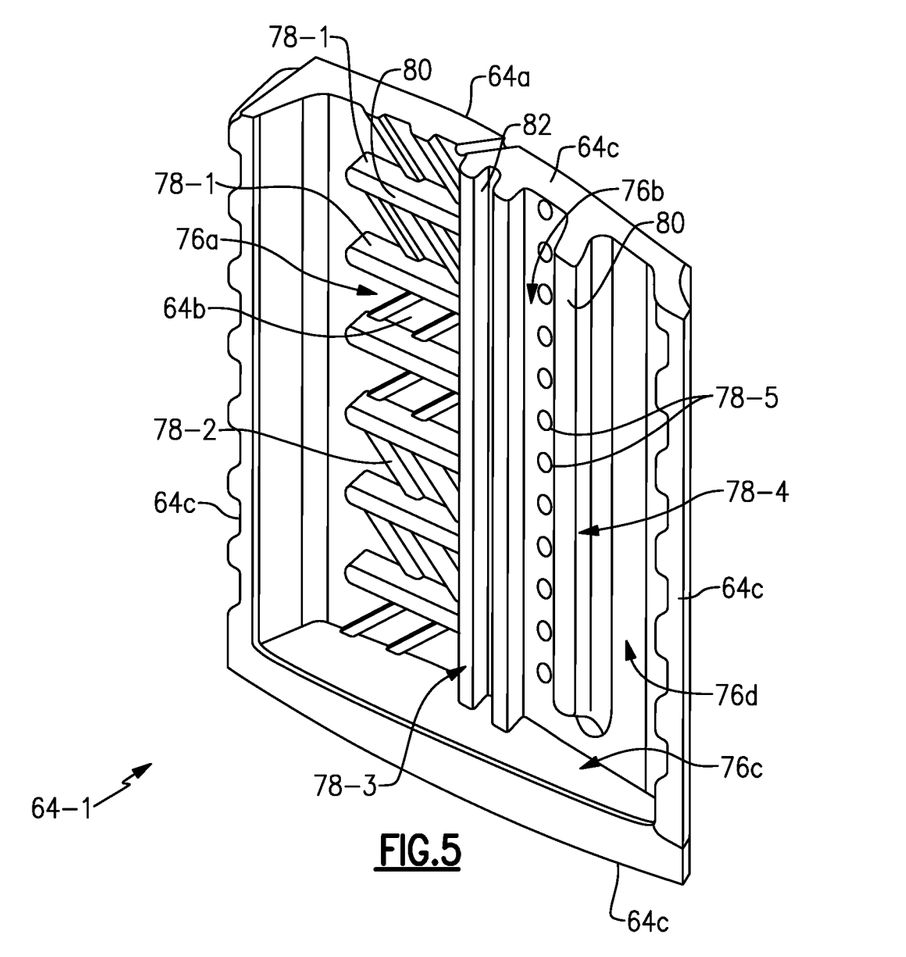
FIG. 5 illustrates an isolated view of a panel of the airfoil of FIG. 2.

FIG. 4 illustrates an isolated view of the panel 64-1, although the examples are also applicable to the panel 64-2 or the panels 64-3/64-4. FIG. 5 illustrates the panel 64-1 and the baffle 74, with selected portions of the baffle 74 cut away.

In the illustrated example, the panel 64-1 includes several different types of flow guides 78, designated 78-1/78-2/78-3/78-4/74-5. It is to be understood that the panels 64 may include only one type of flow guide 78 or may include several different types of flow guides 78 from the examples.

The flow guides 78-1 are protrusions that are generally elongated in an axial direction (relative to engine central axis A). In this example, the panel 64-1 includes a plurality of the flow guides 78-1 that are spaced-apart from each other to form sub-passages 76a. The flow guides 78-1 also include bearing surfaces 80 upon which the baffle 74 seats. The flow guides 78-1 thus serve the dual proposes of influencing flow of cooling bleed air in the passage 76 and facilitating proper positioning of the baffle 74.

The flow guides 78-2 are protrusions that are ridges in the sub-passages 76a. The flow guides 78-2 are spaced-apart in a generally axial direction (relative to the engine central axis A). The flow guides 78-2 serve as trip strips in the sub-passages 76a to mix the cooling bleed air and enhance cooling.

The flow guide 78-3 is a pair of rails that are elongated in a radial direction (relative to the engine central axis A). The pair of rails define a slot 82 there between, in which the spring rib 72a is disposed (FIG. 2). The rails also serve to define sides of the sub-passages 76a and of a sub-passage 76b. The sub-passage 76b is also bordered by flow guide 78-4, which is a rail that is elongated in a radial direction (relative to the engine central axis A). In this example, one end of the flow guide 78-4 is flush or substantially flush with the (top) side edge 64c. The opposed end of the flow guide 78-4 stops short of the opposed (bottom) side edge 64c such that there is a sub-passage 76c around the bottom of the flow guide 78-4. The sub-passage 76c connects the sub-passage 76b with another sub-passage 76d on the opposed side of the flow guide 78-4. The sub-passages 76b/76c/76d thus together form a serpentine sub-passage. The flow guide 78-4 also includes a bearing surface 80, upon which the baffle 74 in the intermediate cavity 70-2 seats.

The panel 64-1 further includes flow guides 78-5 in the sub-passage 76b. The flow guides 78-5 are pedestal protrusions on the panel 64-1. Alternatively, the protrusions may be recesses or blind holes in the panel 64-1. Similar to the trip strips, the protrusions (or recesses) serve to mix cooling bleed flow and thus enhance cooling.

Cooling bleed air may be fed into the interior of the baffle 74 in the forward sub-cavity 70-1. The baffle 74 serves to distribute the cooling bleed air through cooling holes 74a into the passages 76. The air flows through the sub-passages 76a and may be discharged into the core gas path C through cooling holes 84 in the panel 64-1. Cooling bleed air is also fed into the baffle 74 in the intermediate sub-cavity 70-2. The baffle 74 distributes the cooling bleed air through cooling holes 74a into the sub-passage 76b. The air flows into sub-passage 76c and then into sub-passage 76d. The air may then be discharged into the core gas path C through cooling slots or holes 84 at the side edge 64c of the panel 64-1.

The core structure 62 may be metal, such as a nickel alloy, cobalt alloy, a nickel alloy coated with cobalt or cobalt alloy, or a non-nickel alloy that does not react with ceramic. One or more of the panels 64 may be formed of ceramic, to provide thermal and/or environmental resistance. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

In another example, one or more of the panels 64 may be coated with a thermal and/or environmental barrier ceramic coating. As an example, the ceramic coating may include or may be oxides, carbides, nitrides, borides, silicides, or combinations thereof. In further examples, the ceramic coating may be or may include yttria stabilized with zirconia, hafnia, and/or gadolinia, gadolinia zirconate, molybdate, alumina, or combinations thereof.

Figure 6:
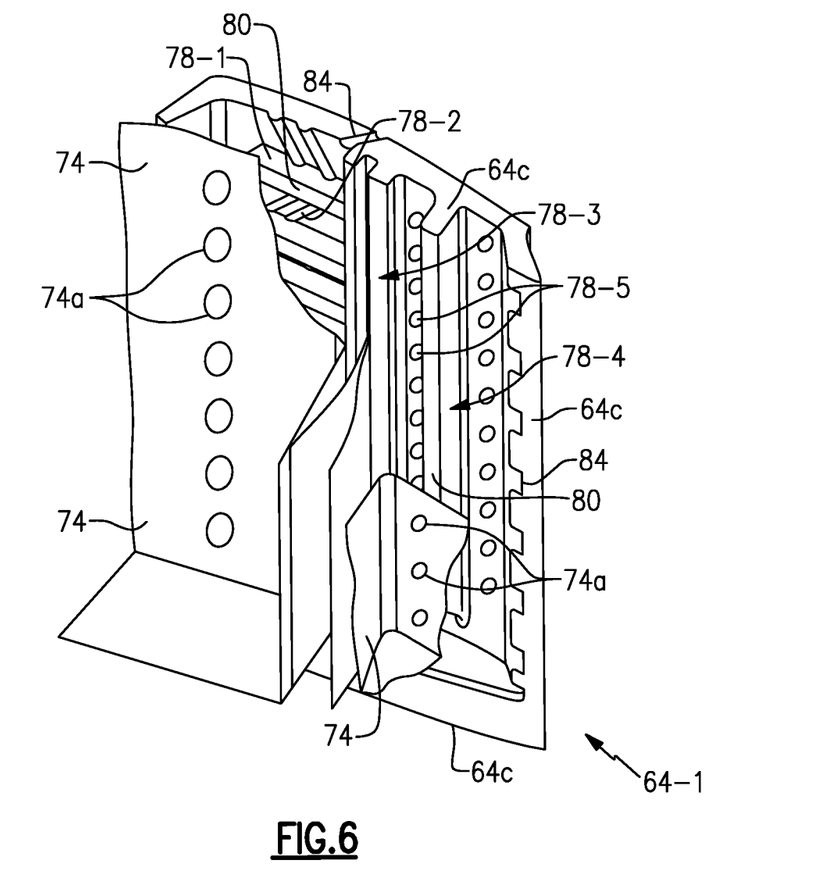
FIG. 6 illustrates a panel and baffles of the airfoil of FIG. 2, with the baffles partially cut away.
Figure 7A:
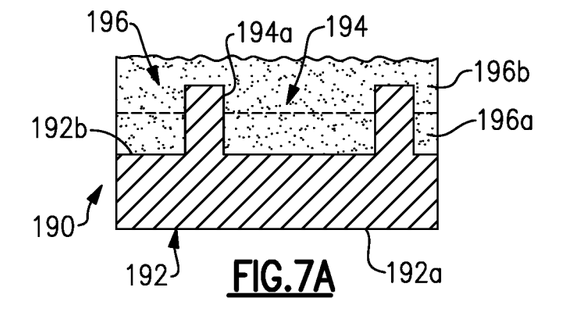
FIG. 7A illustrates a representative portion of a geometric segmented coating section.
Figure 7B:
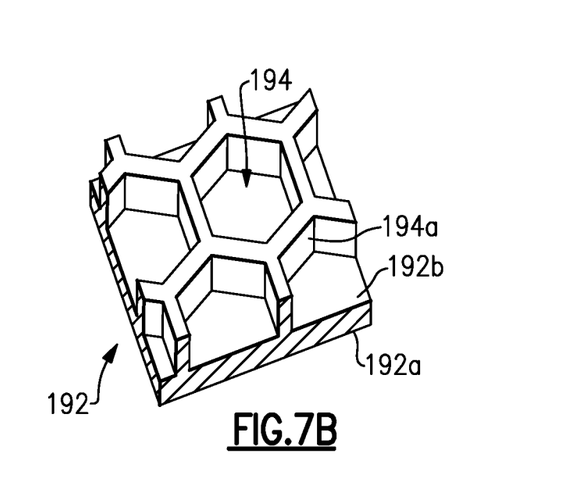
FIG. 7B illustrates a wall of the geometric segmented coating section, without the coating.

Additionally or alternatively, the core structure 62 and/or one or more of the panels 64 may include a geometric segmented coating section. For instance, FIG. 6A illustrates a representative portion of one of the panels 64 (or the core section 62) that includes a geometric segmented coating section 190. The coating section 190 includes a metal wall 192. The metal wall 192 includes a first or inner side 192a and a second or exterior side 192b that is opposite the first side 192a. The exterior side 192b is also the exterior side exposed in the core gas path C. The second side 192b includes an array of cells 194 defined by cell sidewalls 194a. The array is a repeating geometric pattern of one or more cell geometries. In this example, the cell sidewalls 194a have a uniform thickness. As shown in the isolated view of the wall 192 in FIG. 6B, the cells 194 are hexagonal. Alternatively, the cells 194 may be circular, ovular, other polygonal geometry, or mixed cell geometries.

A coating 196 (FIG. 6A) is disposed in the array of cells 194. The cells 194 mechanically facilitate bonding of the coating 196 on the wall 192. The cells 194 thus provide good bonding and spallation resistance of the coating 196, particularly at higher temperature locations. In turn, greater spallation resistance may reduce the need for bleed air for cooling or enable use of higher temperature bleed air that is less of an efficiency penalty. The coating 196 may be a barrier coating, such as a thermal barrier or environmental barrier, which is formed of a ceramic material. The coating 196 may be a monolayer coating but more typically will be a multi-layer coating. For instance, the coating 196 has a first coating layer 196a and a second coating layer 196b. In this example, the second coating layer 196b is a topcoat.

The ceramic material of the coating 196 provides thermal and/or environmental resistance. As an example, the ceramic material may include or may be yttria stabilized with zirconia, hafnia, and/or gadolinia, gadolinia zirconate, molybdate, alumina, or combinations thereof. Additionally or alternatively, the ceramic material may include or may be a ceramic matrix composite which has a reinforcement phase, such as ceramic or carbon fibers, dispersed in a ceramic matrix formed of oxides, carbides, nitrides, borides, silicides, or combinations thereof.

The coating 196 may also include a bond coat for attaching the ceramic material to the wall 192 and cells 194. The wall 192 and cells 194 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 194a also facilitate reducing internal stresses in the coating 196 that may occur from sintering at relatively high surface temperatures during use in the engine 20. The sintering may result in partial melting, densification, and diffusional shrinkage of the coating 196 and thereby induce internal stresses. The cell sidewalls 194a serve to produce faults in at least the portion of the coating 196 above the cell sidewalls 194a. The faults provide locations for releasing energy associated with the internal stresses (e.g., reducing shear and radial stresses). That is, the energy associated with the internal stresses may be dissipated in the faults such that there is less energy available for causing delamination cracking between the coating 196 and the underlying wall 192.

The coating section 190 may be formed using several different fabrication techniques. As an example, the wall 192 may be fabricated by investment casting, additive manufacturing, brazing, or combinations thereof, but is not limited to such techniques. For instance, the cells 194 can be separately fabricated and brazed to the remaining portion of the wall 192, which can be investment cast or additively fabricated. Alternatively, the cells 194 can be formed by other techniques, such as depositing an alloy coating and removing sections of the alloy coating by machining, electro-discharge machining (EDM), or other removal process.

To produce the coating 196, ceramic coating material is deposited in the cells 194. The deposition process can include, but is not limited to, plasma spray or physical vapor deposition. In one example, plasma spray is used to produce a more durable version of the coating 196. For instance, the coating 196 has a laminar microstructure. The laminar microstructure includes grains of ceramic material that have a high aspect ratio. The laminar microstructure is a product of the plasma spray process, in which droplets of melted or partially melted ceramic material are sprayed onto the cells 194. Upon impact, the droplets flatten and solidify, yielding the laminar microstructure. There may be voids or pores among the grains; however, the coating 196 is substantially fully dense. For instance, the coating 196 has a porosity of less than 15%.

The ceramic coating material fills or substantially fills the cells 194 and is deposited in a thickness that is greater than the height of the cell sidewalls 194a. At this stage, the surface of the coating may have contours from the underlying cells 194. If such contours are undesired, the surface may be machined, ground, or abraded flat. For instance, the surface is reduced down to or close to the tops of the cell sidewalls 194a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   a core structure having walls defining a leading end and a trailing end of an airfoil profile and an internal cavity in a central interior region of the core structure, the core structure having a pressure-side panel slot and a suction-side panel slot, each of the pressure-side panel slot and the suction-side panel slot including sloped slot edges that face inwards to the central interior region;

a pressure-side panel and a suction-side panel disposed, respectively, in the pressure-side panel slot and the suction-side panel slot, each of the pressure-side panel and the suction-side panel having sloped panel edges that face outwards from the central interior region and that bear against the sloped slot edges of the pressure-side panel slot and the suction-side panel slot, respectively, the pressure-side panel defining a pressure side of the airfoil profile and the suction-side panel defining a suction side of the airfoil profile such that the pressure-side panel, the suction-side panel, and the walls of the core structure together define a complete peripheral shape of the airfoil profile, each of the pressure-side panel and the suction-side panel having an exterior gas path side and an opposed interior side bordering the internal cavity, the interior side including a pair of rails that define a radial slot there between; and a spring rib spanning across the internal cavity and disposed in the radial slots, the spring rib maintaining the pressure-side panel and the suction-side panel in position against the sloped slot edges.

2. The airfoil as recited in claim 1, wherein the pressure-side panel and the suction-side panel each include at least one flow guide that is selected from the group consisting of a protrusion and a plurality of spaced-apart ridges.

3. The airfoil as recited in claim 1, wherein the pressure-side panel and the suction-side panel each include a bearing surface, and further comprising a baffle seated on the bearing surface.

4. The airfoil as recited in claim 3, wherein the pressure-side panel and the suction-side panel each include a flow guide that forms a serpentine with the baffle.

5. The airfoil as recited in claim 1, wherein the pressure-side panel and the suction-side panel each include a geometric segmented coating.

6. A gas turbine engine comprising:
a compressor section;
a combustor in fluid communication with the compressor section; and
a turbine section in fluid communication with the combustor,
at least one of the turbine section or the compressor section including an airfoil having
a core structure having walls defining a leading end and a trailing end of an airfoil profile and an internal cavity in a central interior region of the core structure, the core structure having a pressure-side panel slot and a suction-side panel slot, each of the pressure-side panel slot and the suction-side panel slot including sloped slot edges that face inwards to the central interior region, a pressure-side panel and a suction-side panel disposed, respectively, in the pressure-side panel slot and the suction-side panel slot each of the pressure-side panel and the suction-side panel having sloped panel edges that face outwards from the central interior region and that bear against the sloped slot edges of the pressure-side panel slot and the suction-side panel slot, respectively, the pressure-side panel defining a pressure side of the airfoil profile and the suction-side panel defining a suction side of the airfoil profile such that the pressure-side panel, the suction-side panel, and the walls of the core structure together define a complete peripheral shape of the airfoil profile, each of the pressure-side panel and the suction-side panel having an exterior gas path side and an opposed interior side bordering the internal cavity, the interior side including a pair of rails that define a radial slot there between, and a spring rib spanning across the internal cavity and disposed in the radial slots, the spring rib maintaining the pressure-side panel and the suction-side panel in position against the sloped slot edges.

7. The gas turbine engine as recited in claim 6, wherein the pressure-side panel and the suction-side panel each include at least one flow guide that is a protrusion.

8. The gas turbine engine as recited in claim 6, wherein the pressure-side panel and the suction-side panel each include at least one flow guide that is a plurality of spaced-apart ridges.

9. The gas turbine engine as recited in claim 6, wherein the pressure-side panel and the suction-side panel each include a bearing surface, and further comprising a baffle seated on the bearing surface.

* * * * *